(12) United States Patent
Weil et al.

(10) Patent No.: US 7,380,017 B2
(45) Date of Patent: May 27, 2008

(54) ROUTE PROTECTION IN A COMMUNICATION NETWORK

(75) Inventors: Jon Weil, Coton (GB); Alex Morrall, Finham (GB); David Odhams, Epping (GB); Kenneth Hayward, Kanata (CA); Loa Andersson, Alvsjo (SE)

(73) Assignee: Nortel Networks Limited, St. Laurent, Quebec (CA)

( * ) Notice: Subject to any disclaimer, the term of this patent is extended or adjusted under 35 U.S.C. 154(b) by 1453 days.

(21) Appl. No.: 09/848,743

(22) Filed: May 3, 2001

(65) Prior Publication Data
US 2002/0188756 A1    Dec. 12, 2002

(51) Int. Cl.
G06F 15/173    (2006.01)
(52) U.S. Cl. .................... 709/239; 714/4; 370/216; 370/242
(58) Field of Classification Search ........ 709/238–242; 370/351, 216–217, 238; 714/4
See application file for complete search history.

(56) References Cited

U.S. PATENT DOCUMENTS

| | | | |
|---|---|---|---|
| 6,111,672 A | | 8/2000 | Davis et al. |
| 6,122,753 A | * | 9/2000 | Masuo et al. .................. 714/4 |
| 6,347,078 B1 | * | 2/2002 | Narvaez-Guarnieri et al. ... 370/230 |
| 6,392,989 B1 | * | 5/2002 | Jardetzky et al. ........... 370/216 |
| 6,567,194 B1 | * | 5/2003 | Badr ............................. 398/1 |
| 6,704,279 B2 | * | 3/2004 | Klink ........................ 370/225 |
| 6,751,746 B1 | * | 6/2004 | Jain et al. ...................... 714/4 |
| 6,791,939 B1 | * | 9/2004 | Steele et al. ................ 370/217 |
| 6,813,242 B1 | * | 11/2004 | Haskin et al. .............. 370/229 |
| 2002/0004843 A1 | * | 1/2002 | Andersson et al. ......... 709/238 |

FOREIGN PATENT DOCUMENTS

| | | |
|---|---|---|
| WO | WO 98/29989 | 7/1998 |
| WO | WO 00/79730 | 12/2000 |

OTHER PUBLICATIONS

Landegem T V et al. "Managing a Connectionless Virtual Overlay Network on Top of an ATM Network"—Proceedings of the International Conference on Communications, New York, IEEE, US, vol. 1, Jun. 23, 1991, pp. 988-992.

* cited by examiner

Primary Examiner—Salad E Abdullahi
(74) Attorney, Agent, or Firm—Barnes & Thornburg

(57) ABSTRACT

A communications network comprises a lower transport layer and an upper overlay incorporating a plurality of routers. Adjacencies are defined between respective pairs of routers. Path protection is provided by defining a software model of the overlay of the network and defining in the model a hierarchy of protection levels for the main path. Each protection level is characterised by a respective set of one or more broken adjacencies in the model, the adjacencies to be broken being determined from a knowledge of the underlying topology. A protection level is selected and a protection path avoiding the broken adjacencies associated with that protection level is calculated. If this calculated path is not available in the real network, a lower protection level in the hierarchy is selected and the protection path calculation repeated. The process continues until a suitable protection path is identified.

28 Claims, 13 Drawing Sheets

Shortest Path

| | Shortest Path | Protection Path | Adjacencies Broken | | | | |
|---|---|---|---|---|---|---|---|
| Protection level 7 | A B C D | A E C | A-B | | | | |
| Protection level 6 | A B C D | A E C | A-B | B-C | | | |
| Protection level 5 | A B C D | A E F C | A-B | B-C | C-F | C-E | |
| Protection level 4 | A B C D | A H J K C | A-B | B-C | C-F | A-L | |
| Protection level 3 | A B C D | A H J K C | A-B | A-E | A-L | B-C | C-F | C-E |
| Protection level 2 | A B C D | A E C | A-B | A-E | A-L | B-C | C-F | C-E |
| Protection level 1 | A B C D | A H J K C | A-B | A-E | A-L | B-C | C-F | C-E | H-L |

Combined network diagram

ROUTE PROTECTION IN A COMMUNICATION NETWORK

FIELD OF THE INVENTION

This invention relates to methods and arrangements for providing recovery from faults in a communications network and for calculating protection paths in such a network. The invention further relates to a network manager arranged to perform such path calculation.

BACKGROUND OF THE INVENTION

Modern communication networks are designed as a layered structure in which lower layers provide communication services for upper layers. These upper layers each have a topology which, when configured logically, may he referred to as an overlay topology. For efficiency reasons an overlay topology might not have a one-to-one correspondence with the underlying topology that supports it.

Each layer commonly has its own responses to changes in the network, including alarms in the case of failure. A typical example of a layered topology which illustrates the interplay of alarms and layers is the case of a SONET or SDH (Synchronous Digital Hierarchy) ring supporting IP (Internet Protocol) traffic that is routed by Open Shortest Path First (OSPF) protocol. A network may detect a failure at the SONET layer and respond within 100 ms to switchover traffic using Automatic Protection Switching (APS). If it is unable to take this action, then, in the scale of tens of seconds (typically 30 to 40 seconds) OSPF neighbours whose adjacency was supported by the failed equipment will notice the loss of adjacency and take actions to re-converge the network to support IP routing, e.g. by flooding of Link State Advertisements, and computation of routing tables.

Alarms at different network layers are capable of providing different amounts of information about the nature of a network fault. Lower layer alarms provide more detail than higher layer alarms. For example, SONET systems typically produce thousands to millions of alarms in response to a single fibre break. SONET networks themselves are designed as layered systems and each layer propagates specific alarms up to the management plane. These alarms can be correlated to determine the precise nature of a fault. Loss of IP adjacency supported by a failed fibre, however, only indicates that, at some SONET layer, or possibly due to a break in fibre, a failure to get IP layer messages between peers has occurred.

Not all networks which carry IP traffic have SONET protection beneath them. To provide fast restoration at the IP layer for Hop by Hop routed traffic or for Multi-Protocol Label Switching (MPLS) label switched paths, schemes have been proposed that act on loss of IP layer adjacency in order to route traffic around failed equipment to where it might be forwarded normally again. The requirement for these schemes is to get traffic flowing again on the scale of 10s of milliseconds to support services like voice or video over IP.

A particular problem with current fault recovery systems is that of determining an effective recovery path. As the network upper and lower layers may have a differing topology, there is a risk that a minor 'route around' path change may not avoid the fault. There is the further problem of determining the precise nature of the fault. For example, it may not be easy to determine with any degree of rapidity whether a network failure has resulted from a fault in a switch, a router or a fibre path.

SUMMARY OF THE INVENTION

An object of the invention is to overcome or at least to mitigate one or more of the above problems.

A further object of the invention is to provide an improved arrangement and method for the determination of protection paths in a communications network.

According to a first aspect of the invention there is provided a method of fault recovery in a multi-layer communications network having a transport layer and an overlay topology in which adjacencies are defined between a plurality of network nodes, the method comprising, for each adjacency for which a recovery path is to be determined, modifying the overlay topology by removal of selected adjacencies, attempting computation of a path, and if no path is available, removing fewer selected adjacencies from the overlay topology and repeating said path computation.

According to another aspect of the invention there is provided a method of calculating a protection path for traffic carried on a main path in a multilayer communications network having a lower transport layer and an upper layer incorporating a plurality of routers, and in which adjacencies are defined between respective pairs of routers, the method comprising the steps of;

defining a model of the upper layer of the network;
defining a hierarchy of protection levelseach being characterised by a respective set of broken adjacencies; attempting to calculate a recovery path for a selected protection level in said hierarchy; and
if no said path is available, repeating said calculation attempt for successive further protection levels in said hierarchy until a protection path is identified.

According to another aspect of the invention there is provided a method of calculating a protection path for traffic carried on a main path in a multi-layer communications network comprising a lower transport layer and an upper overlay incorporating a plurality of routers, there being a plurality of adjacencies defined between respective pairs of routers, wherein the method comprises the steps of;

defining a software model of the overlay of said network;
defining in said model a hierarchy of protection levels for said main path, each said protection level being characterised by a respective set of one or more broken adjacencies in said model;
selecting one said protection level and calculating a protection path avoiding the broken adjacencies associated with that protection level;
determining whether the calculated protection path is available in the network; and,
if said calculated path is not available in the network, repeating said path calculation and determining steps for one or more further selected protection levels.

According to another aspect of the invention there is provided a method of identifying a protection path for traffic carried on a main path in a multi-layer communications network so as to remedy a fault condition involving one or more network elements, the method comprising the steps of:

assuming the failure of a plurality of network elements;
calculating a protection path circumventing all the assumed failed network elements and determining whether that calculated path is an available path in the network; and
if said calculated path is not an available path in the network, successively assuming the failure of fewer network elements and repeating the path calculation and determination steps for each successive assumption until an available protection path is identified.

According to another aspect of the invention there is provided a method of network management for planning fault recovery paths in a multi-layer communications network having a transport layer and an overlay topology, and in which adjacencies are defined between a plurality of network nodes, the method comprising, providing a model of the network, and within said model for each recovery path to be determined, modifying the overlay topology by removal of selected adjacencies, attempting computation of a recovery path, and if no recovery path is available removing fewer selected adjacencies from the overlay topology and repeating said recovery path computation.

According to a further aspect of the invention, there is provided a network manager for a multi-layer communications network and for planning fault recovery paths in said network so as to remedy a fault condition involving one or more network elements on a traffic path, the network manager being arranged to perform the method steps of: providing a model of the network; assuming the failure of a plurality of network elements in said model; calculating a protection path circumventing all the assumed failed network elements and determining whether that calculated path is an available path in the network; and if said calculated path is not an available path in the network, successively assuming the failure of fewer network elements and repeating the path calculation and determination steps for each successive assumption until an available protection path is identified.

In the network, adjacencies are defined between respective pairs of routers. Path protection is provided by defining a software model of the overlay of the network and defining in the model a hierarchy of protection levels for the main path. Assumptions are made, based on a knowledge of the underlying topology, to determine a set of network elements any one of which may contain the fault. It is not assumed that all those elements are faulty but, by selecting an appropriate set of elements, there is a significant probability that the faulty element(s) will be captured within that set. For each network element within that selected set, all adjacencies involving that element are considered as broken and are removed from the model. Each protection level is characterised by a respective set of one or more broken adjacencies in the model. A protection level is selected and a protection path avoiding the broken adjacencies associated with that protection level is calculated. If this calculated path is not available in the real network, a lower protection level in the hierarchy is selected and the protection path calculation repeated. The process continues until a suitable protection path is identified.

Preferably, the path calculation process is performed by software in machine readable form on a storage medium. The software may be incorporated in a network manager used to control the network.

The recovery path calculation may be performed in response to the detection of a fault, or a standby set of recovery paths may be calculated for future use in the event of a fault being detected.

The network may comprise an Internet Protocol network overlaid on a synchronous optical transport network Advantageously, the path calculation is performed via a next next hop algorithm.

BRIEF DESCRIPTION OF THE DRAWINGS

An embodiment of the invention will now be described with reference to the accompanying drawings which:

FIG. 1b is an abstract representation of the network of FIG. 1a;

FIG. 2a illustrates an exemplary network model for performing a preferred method of recovery path calculation in a multilayer network;

FIG. 2b is a table listing protection levels and corresponding adjacencies in the network model of FIG. 2a;

DESCRIPTION OF PREFERRED EMBODIMENTS

Figure 1A:
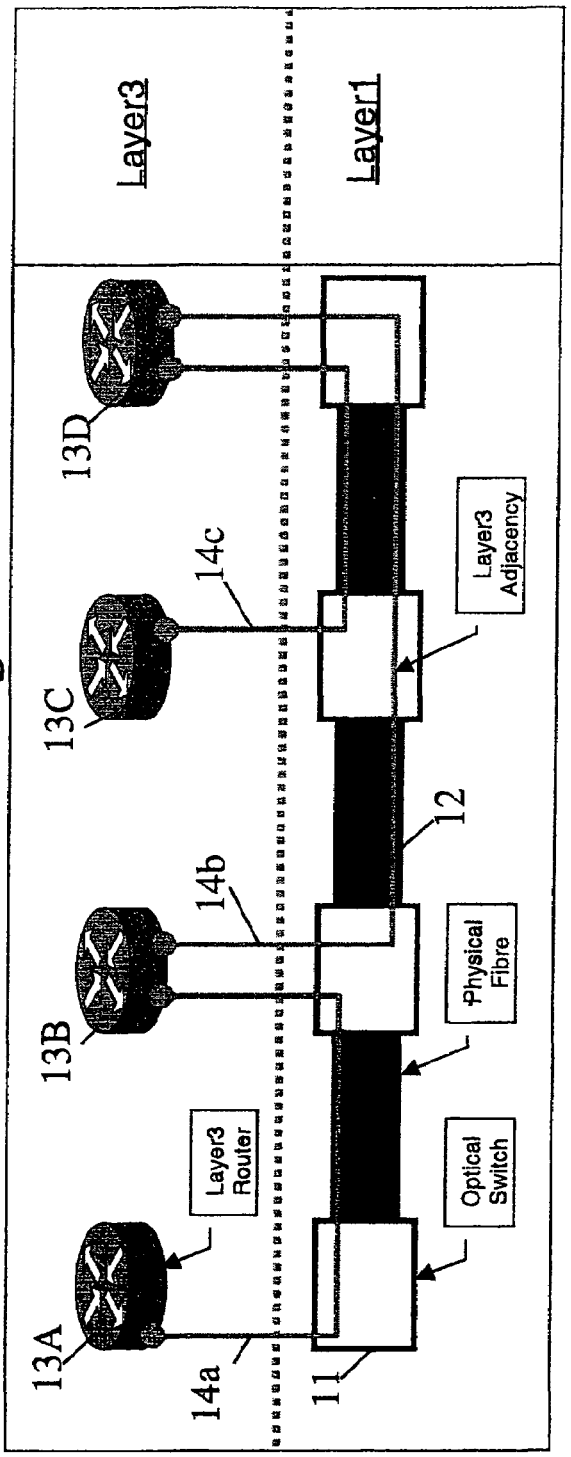
FIG. 1a is a block schematic diagram of a multilayer communications network.
Figure 1B:
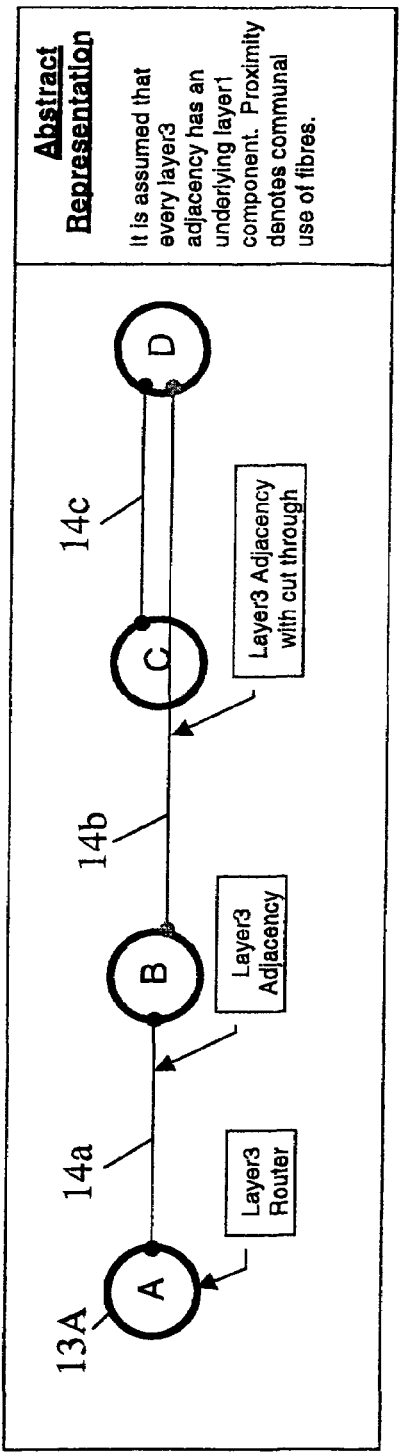

Referring first to FIG. 1a, this shows a multilayer network construction in highly schematic form. The network comprises a lower layer (layer 1 or physical layer) incorporating a plurality of switches 11 interconnected by optical fibre links 12. The upper layer or overlay (layer 3 or IP layer) of the network comprises a plurality of routers 13A to 13D. Although FIG. 1 shows each router being associated with a respective switch, this is not essential. As depicted schematically in FIG. 1b, layer 3 adjacencies 14a, 14b, 14c are defined between selected pairs of routers. It will of course be understood that although FIGS. 1a and 1b show four routers and four switches, a practical network will comprise a large number of such components.

It will of course be appreciated that, although the exemplary network of FIG. 1 has optical links between nodes, the path recovery techniques to be described below are equally applicable to networks having wired or wireless links, or free space optical/infra red links between nodes.

At layer 1, the network of FIG. 1 is commonly connection-oriented, although connectionless operation is possible. At layer 3, the network may be either connectionless or connection-oriented.

FIG. 1b shows the abstract overlay representation of the network of FIG. 1a and for clarity shows only the layer 3 structure. In this figure, adjacencies 14a and 14b are shown between routers 13A, 13B and 13B and 133D respectively A cut-through adjacency 14b is shown between routers 13B, 13D. It is assumed in FIG. 1b that every Layer 3 adjacency has an underlying Layer 1 component, and that physical proximity of this router denotes a commercial use of optical fibres therebetween.

Figures 2A, 2B:
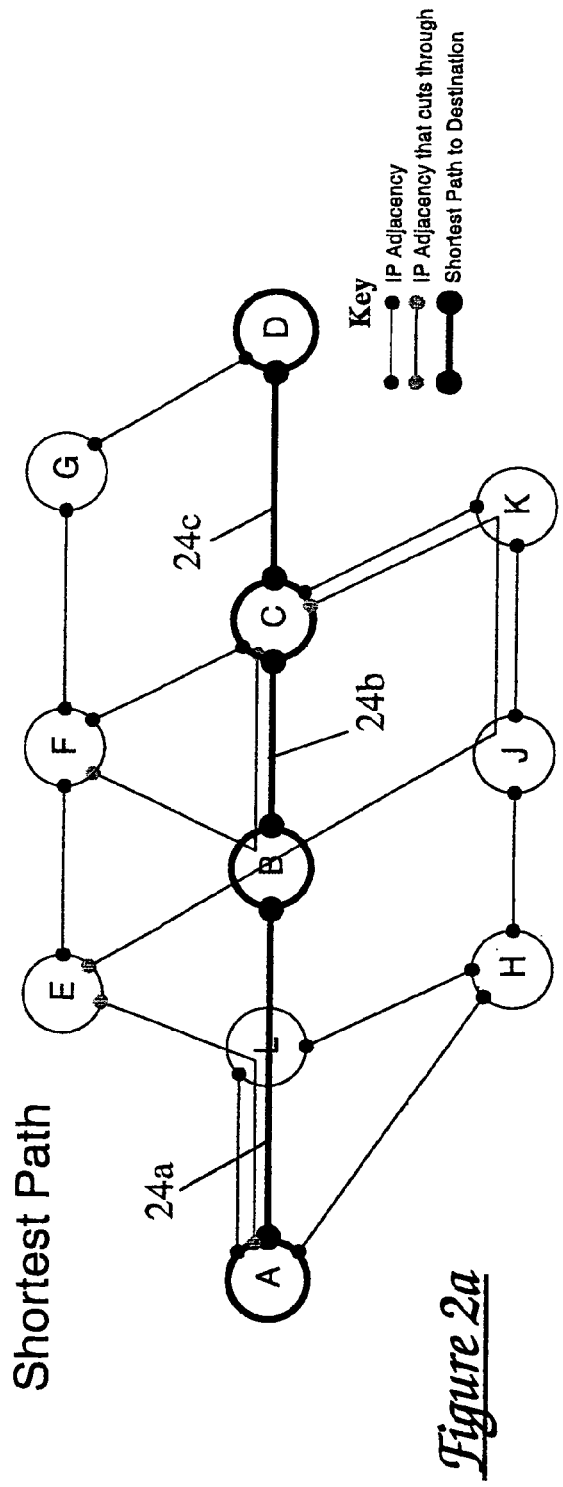

Referring now to FIG. 2a, this depicts schematically a model of an exemplary layer 3 or IP layer topology. In the exemplary network model of FIG. 2a, nodes E to L are linked by adjacencies to one or more of the nodes A to D so as to provide fault protection paths as will be described below. Advantageously, FIG. 2a represents a software model of the overlay topology, and may thus be embodied within a network manager. Typically, the network manager will be embodied as software in machine readable form on a storage medium.

Advantageously, the network model of FIG. 2a is stored as a reference or master from which copies are made as required to perform the recovery path calculation process as will be described below.

In FIG. 2a, an explanatory key is provided showing the line formats that are employed, and indicates respectively, IP adjacencies, IP cut through adjacencies, the shortest path to the next next hop, and the shortest path to the destination. For the sake of clarity and consistency, the full key is shown on each of these figures even though not every element of the key may be incorporated in a particular figure.

FIG. 2b is a table detailing a number of protection levels for the layer 3 topology of FIG. 2a. The table lists a hierarchy of protection levels ranging from a weakest level (level 7) to a strongest level (level 1). These protection levels will be discussed individually with reference to FIGS. 3 to 9 below. It will of course be understood that the seven protection levels shown in FIG. 2b are given by way of example only and that the particular number of protection levels to be employed will in general be determined by network topology and the operational constraints.

In the exemplary overlay network model of FIG. 2a, node A is the start node and node D is the destination node for a traffic path through the network. It is this traffic path that is to be protected. For simplicity of explanation, all links in the exemplary network of FIG. 2a have a metric equal to 1. The shortest path from node A to node D is shown in bold. This path comprises A(start node) to B(Next hop) 24a, to C (next next hop) 24b, to D (Destination) 24c. Other adjacencies in FIG. 2a are indicated by respective line formats as indicated by the accompanying key.

Figure 3A:
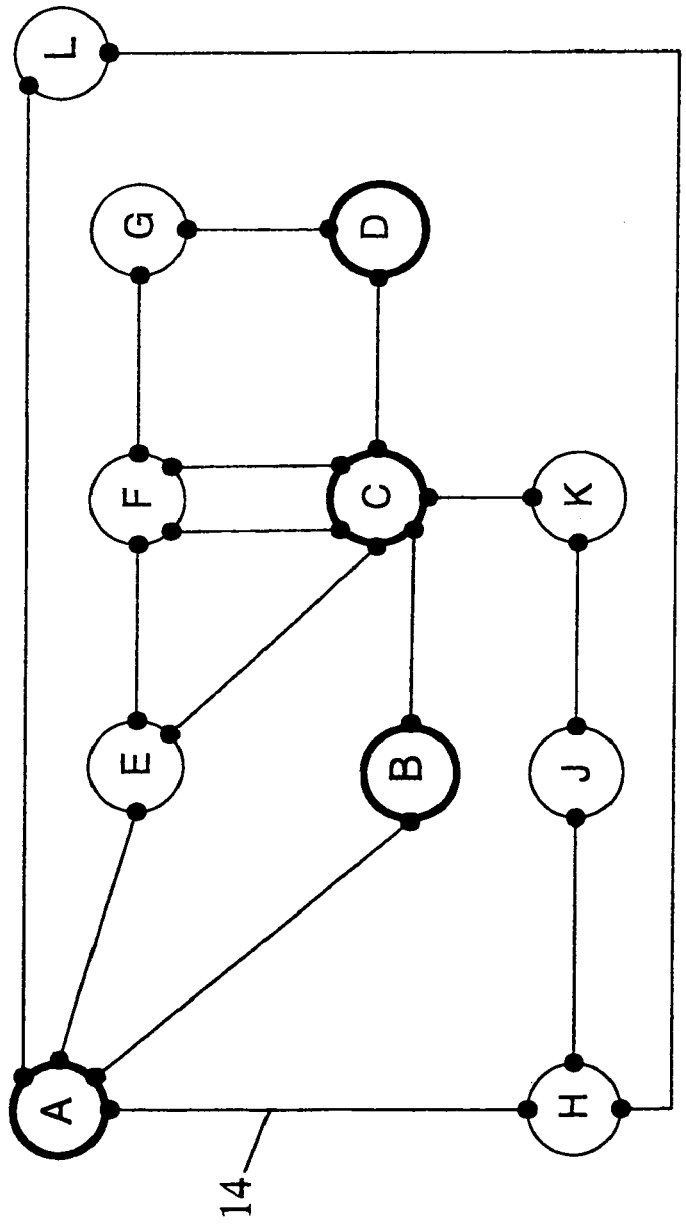
FIGS. 3a to 3c illustrate the method of constructing the model network of FIG. 2a from the corresponding real network.
Figure 3B:
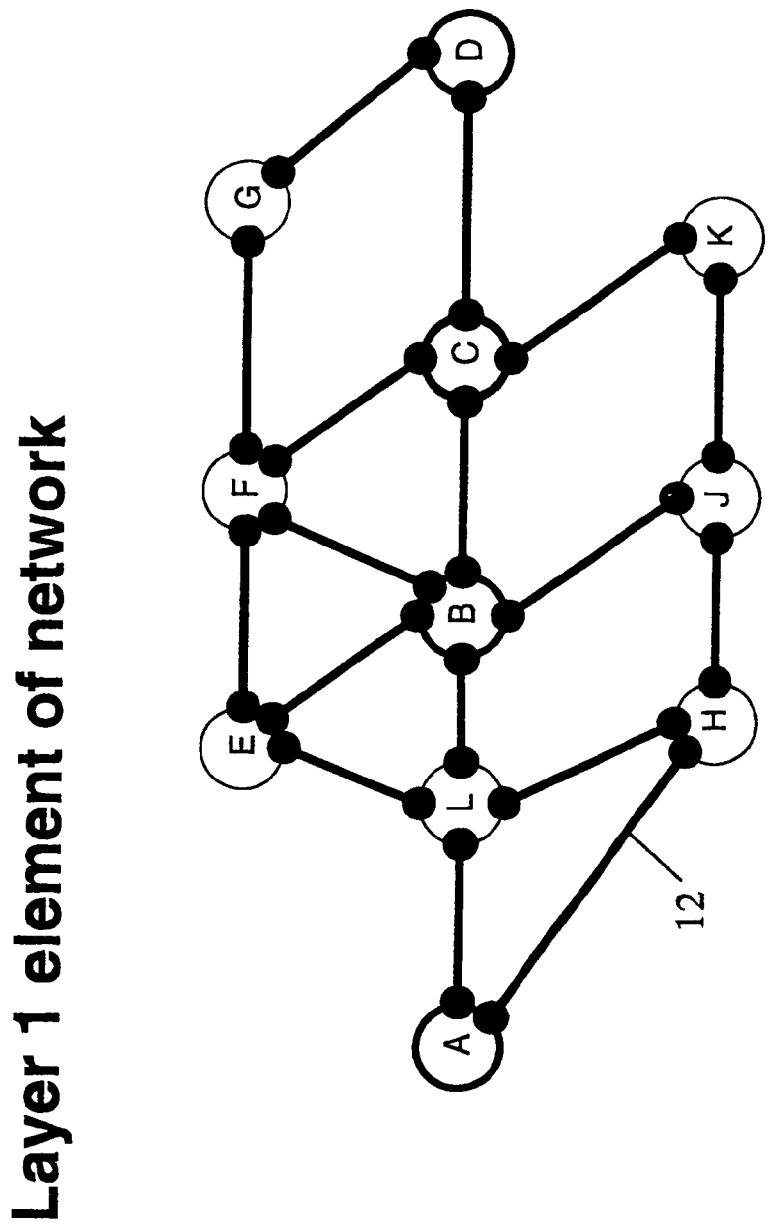
Figure 3C:
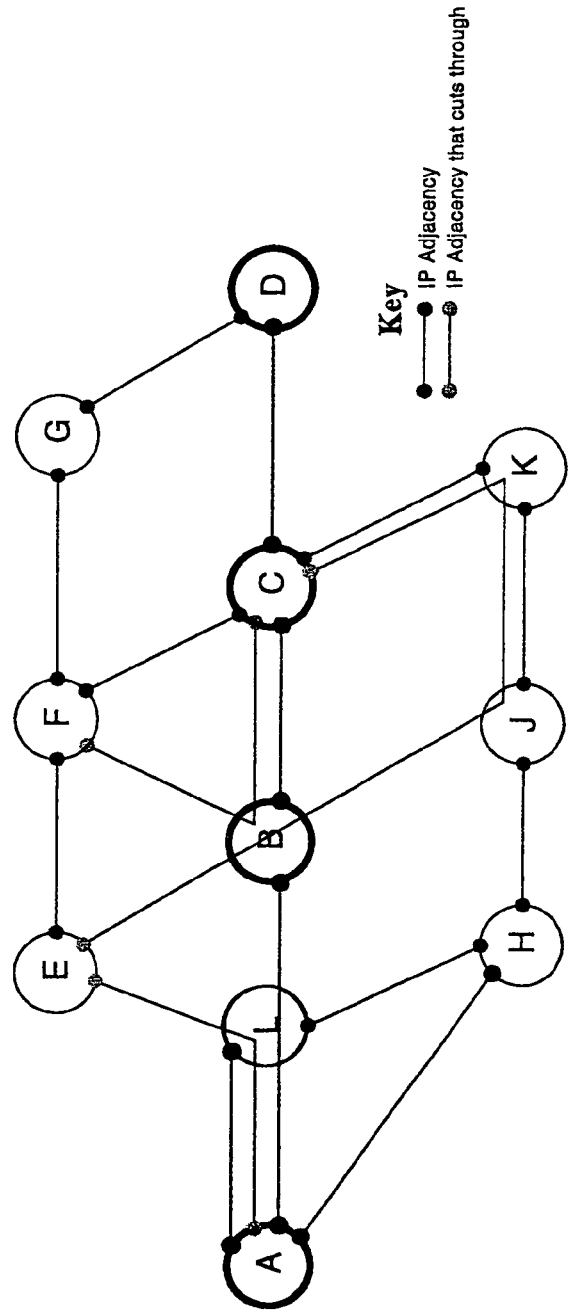

Referring now to FIGS. 3a to 3c, these illustrate the steps in the construction of the model of FIG. 2a from the real network topology. FIG. 3a depicts the Layer 3 topology of the network and shows the Layer 3 interconnections 14 between the routers disposed at the network nodes A to L. FIG. 3b depicts the underlying Layer 1 topology and shows the physical interconnections 12 between the switches disposed at the network nodes. These two topologies are combined in the composite diagram of FIG. 3c in which the Layer3 interconnections or adjacencies 14 are shown explicitly, and the Layer 1 interconnections are inferred implicitly from physical proximity between nodes.

Referring again to FIG. 2a, in order to provide protection in the event of a fault on the traffic path, recovery paths from node A are generated to address an indication of a loss of IP layer adjacency between nodes A and B. A next next hop algorithm is used to compute the recovery paths around the failure, from A to the next next hop (NNH), which in this case is node C. This algorithm uses the shortest path to the hop following the next hop. In the event of a fault on the path between nodes A and B, the consequent loss of adjacency on the link from A to B may have been caused by one or more of several failures. For example, the node B (switch and router) may have totally failed, the fibre section between nodes A and L may have failed, or the switch at node L may have failed. It is assumed for the purposes of this fault analysis that if the router at node L would have failed, the IP adjacency between A and B may still be maintained.

It will of course be understood that use of a NNH algorithm or indeed a shortest path algorithm is not essential. Thus, the particular form of algorithm to be employed may be selected according to the physical construction of the network and the operating protocols employed.

In a preferred embodiment, the method comprises making an assumption, based on a knowledge of the underlying topology, that several network elements have failed, and calculating in the model network a protection path based on that assumption. If this path is not available in the physical network, or is not acceptable to the network operator, a next assumption is made that fewer network elements have failed and a new protection path is calculated. The process is continued with further assumptions that successively fewer network elements have failed until a suitable protection path is determined.

When calculating a recovery path to remedy a network fault, it is not always necessary to commence at the highest protection level in the hierarchy and assume that a maximum number of network elements have failed. Commencing with the highest protection level may be desirable for high priority traffic, such as voice traffic, where it is essential to minimise the risk of service degradation. For lower priority traffic it will generally be acceptable to commence at a lower protection level. The starting protection level may also be chosen from a prior knowledge of the reliability profiles and(or the service history of the network elements involved in the traffic path that is to be protected.

In the calculation process, a knowledge of the lower level topology is used to make assumptions as to the network elements that may have failed causing a fault.

When a fault occurs, it may not be immediately apparent as to which particular network element has failed causing the fault. An initial assumption is thus made that the fault lies within one of a significant number of network elements, and an attempt is made to calculate a recovery path which avoids the use of any of these particular elements. In the event that no acceptable path can be found, a further assumption is made that the fault lies within one of a smaller number of network elements, and the path calculation process repeated. this process continues until an appropriate recovery path is found.

An exemplary hierarchy of protection levels for the network model of FIG. 2a will now be described with reference to FIGS. 4 to 10 below. For each protection level, a copy is made of the reference model of FIG. 2a, and that copy is then used as a "test bed" to determine the effect of the failure assumptions that are made for that protection level. At each protection level, the appropriate assumptions are made as to which set of network elements may contain the fault. Those network elements are then considered as removed from the topology and the adjacencies supported by those network elements are considered as broken. Calculations are then performed to determine what remedial actions are available in the event that those adjacencies are lost. The assumptions may be further modified by use of information on the service history of the individual network elements. For example, a particular router may have a poor reliability record and, in the event of a fault, this router will be a prime candidate for the probable location of the fault.

In each of FIGS. 4 to 10 an explanatory key is employed, and indicates respectively, IP adjacencies, IP cu through adjacencies, broken adjacencies, and the shortest path to the destination. For the sake of clarity and consistency, the full key is shown on each of FIGS. 4 to 10, even though not every element of the key may be incorporated in a particular figure.

Figure 4:
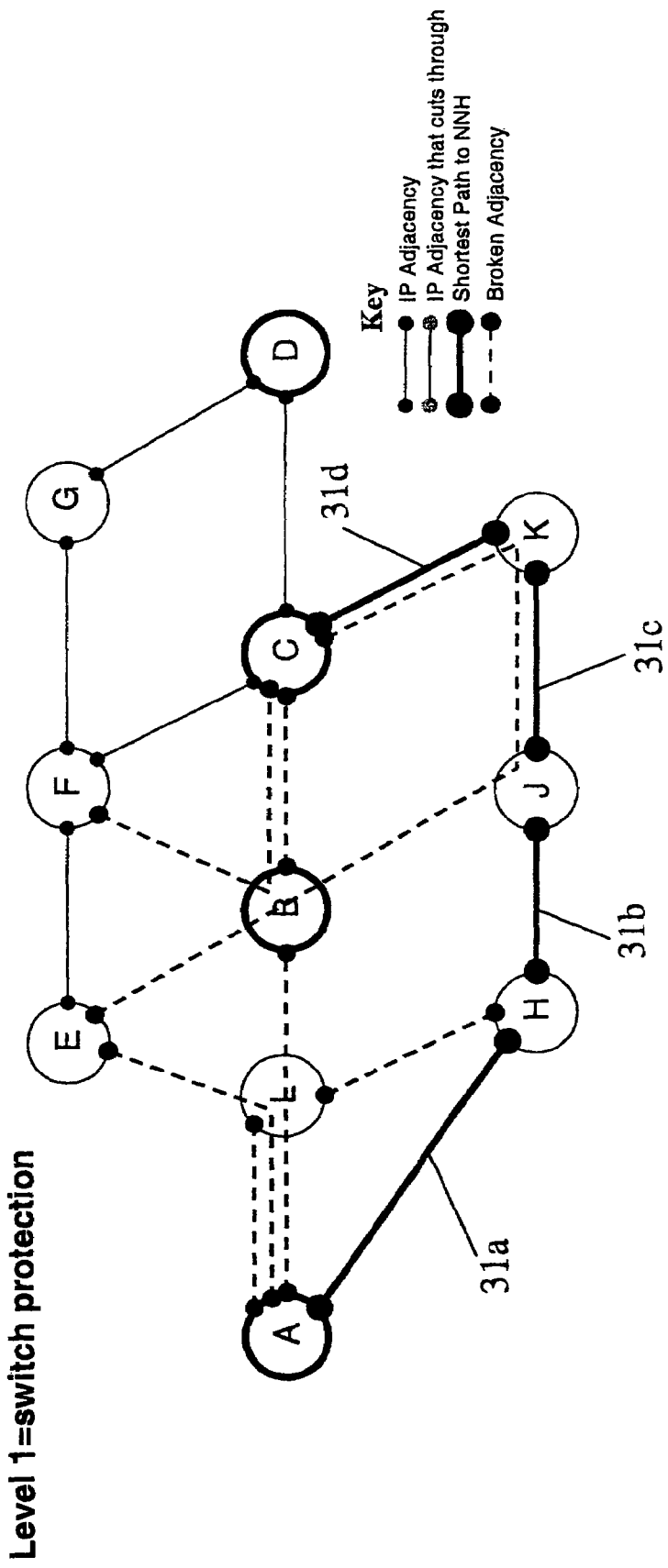
FIGS. 4 to 10 illustrate recovery path computational options in the network model of FIG. 2a for a set of protection levels.

FIG. 4 depicts level 1 protection (the highest level) and illustrates the computation of a recovery path that circumvents the failure in the network under the assumption that the failure accounting for the loss of adjacency is loss or an entire router and/or switch at some point along the path from the start node to the next hop and that the next hop can provide no Layer 1 or Layer 3 services. At Level 1 protection (switch protection), an assumption is made that the fault lies somewhere within the set of network elements supporting the Layer 1 and Layer 3 services along the Layer1 path from the start node to the next hop. As a consequence it is assumed that, within the network model, these Layer 1 and Layer 3 services have failed, and that the next hop has failed at both Layer 3 and Layer 1. In this case the Layer1 path from the start node to the next hop is A to L to B. To fail all Layer 3 services along this path, all adjacencies which terminate at either node L or node B are assumed to be broken. These adjacencies, are A to L, A to B, L to H, and B to C. To fail Layer 1 services along this path, all adjacencies which pass through either node L or node B are also assumed to be broken. These adjacencies are A to E, E to C and F to C. It should be noted that, for example, although the cut-through adjacency between nodes E and C passing through nodes J and K is considered as broken in the model, the direct adjacencies from J to K and from K to C remain. All assumed failed adjacencies are shown as dashed lines in FIG. 4, and in the seventh row of the table in FIG. 2b. It is possible that the first adjacency may pass through several nodes before reaching the next hop. In this case, all of the adjacencies which terminate at the nodes that the first adjacency passes through must also be assumed to have failed, even if this is the majority of the network. In the assumption that these adjacencies have failed we now calculate the shortest path to the next next hop(NNH) with the remaining topology. FIG. 4 shows this recovery path 31a, 31b, 31c, 31d in bold i.e. the links A to H, H to J, J to K, and K to C.

Figure 5:
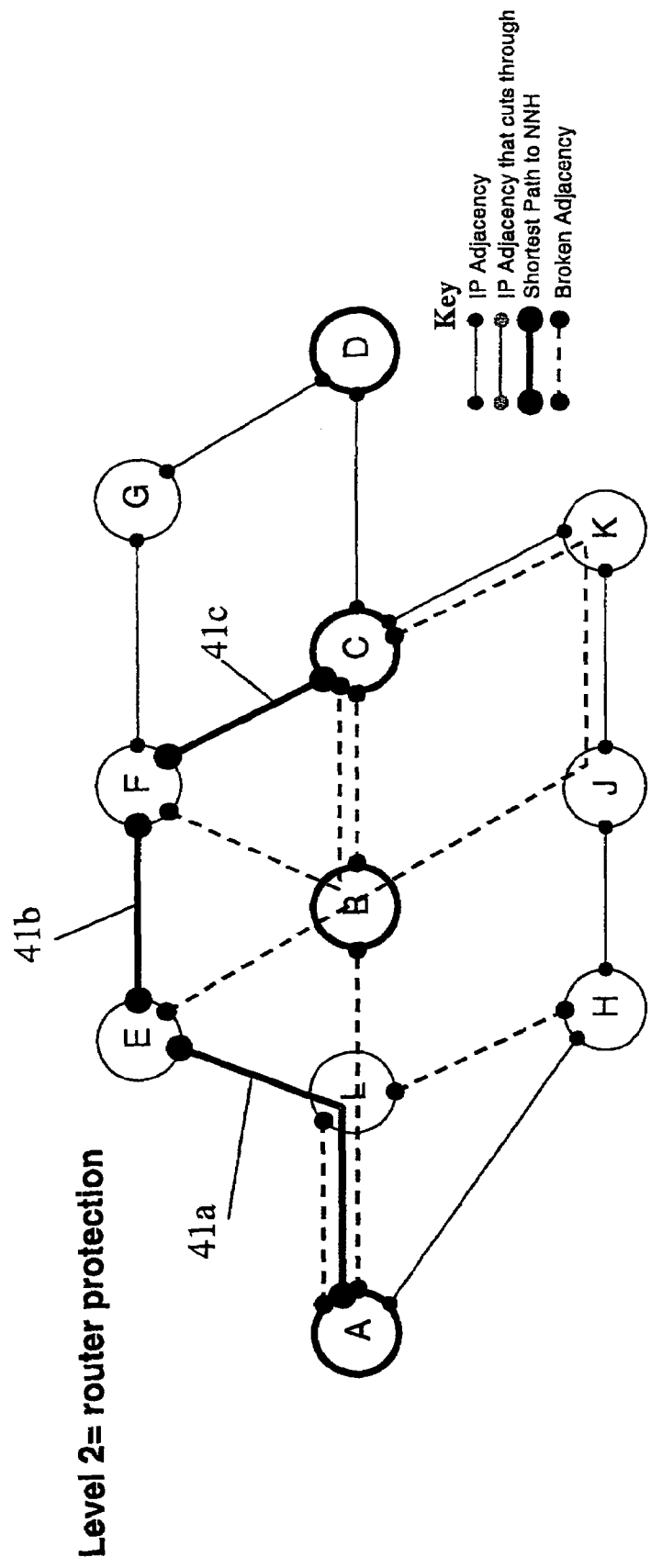

FIG. 5 depicts level 2 protection and illustrates the computation of a recovery path that circumvents the failure in the network under the assumption that the failure accounting for the loss of adjacency is loss of the entire router at some point along the path from the start node to the next hop and that the next hop can provide no Layer 1 or Layer 3 services. At Level 2 protection (router protection), an assumption is made that the fault lies somewhere within the set of network elements supporting the Layer 3 services along the Layer 1 path from the start node to the next hop. It is thus assumed that these services have failed and that the next hop has failed at both Layer 3 and Layer1. In this case the Layer 1 path from the start node to the next hop is A to L to B. To fail all Layer 3 along this path, all adjacencies which terminate at either node L or node B must be considered as failed. These adjacencies are A to L, A to B, L to H, and B to C. The other adjacencies which have failed because of their interaction with the next hop are E to C, and F to C (all assumed failed adjacencies are shown as a dashed black lines in FIG. 5, and in the sixth row of the table in FIG. 2b). Once again it is possible that the first adjacency may pass through several nodes before reaching the next hop. In this case all of the adjacencies which terminate at the nodes that the first adjacency passes through must also be assumed to have failed, even if this is the majority of the network. In the assumption that these adjacencies have failed we now calculate the shortest path to the next next hop(NNH) with the remaining topology. FIG. 5 shows this recovery path 41a, 41b, 41c in bold, i.e. the links A to E, E to F, and F to C.

Figure 6:
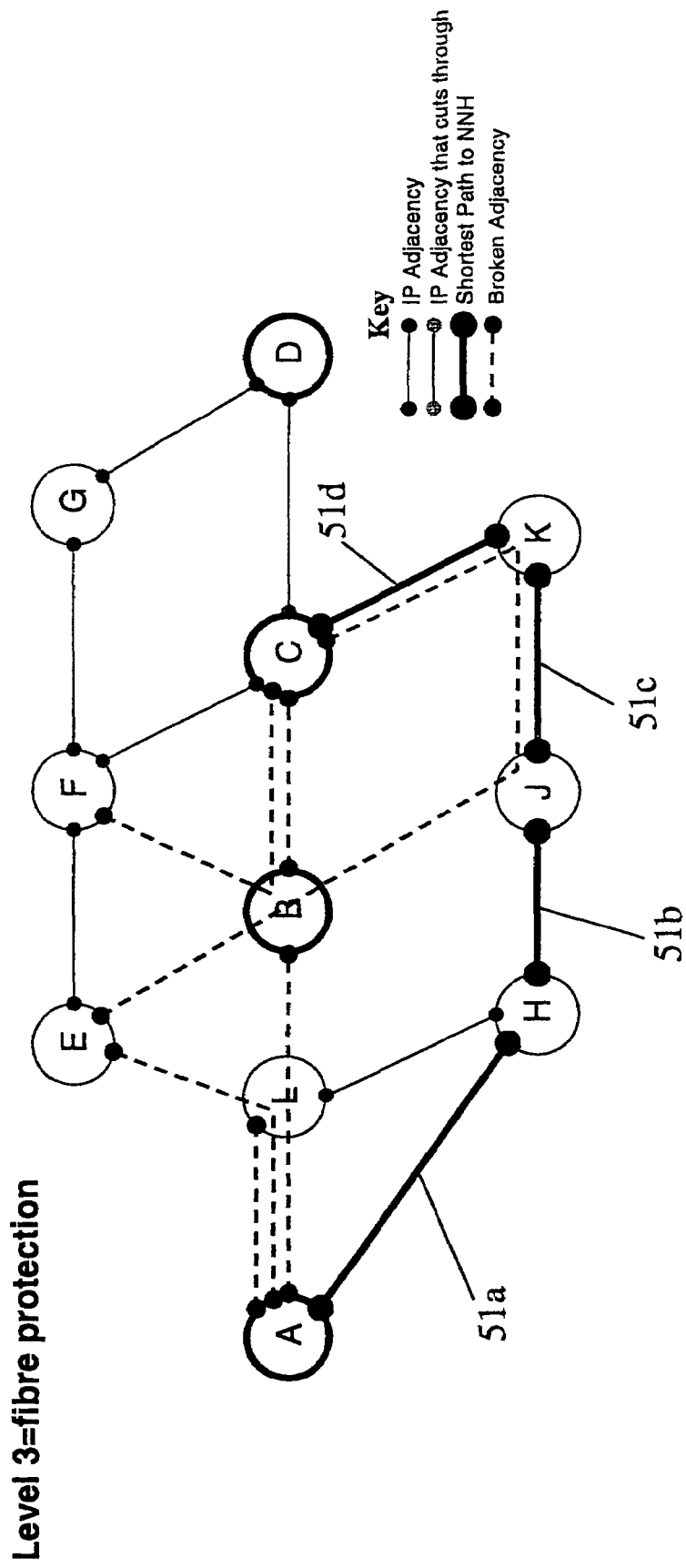

FIG. 6 depicts level 3 protection and illustrates the computation of a recovery path that circumvents the failure in the network under the assumption that the failure accounting for the loss of adjacency is loss of the entire router and/or the entire switch at the next hop, or the loss of a fibre that mediates the A to B adjacency. At Level 3 protection (fibre/next hop protection), it is assumed that all of the adjacencies share fate e.g. by passing through the same ducts or fibres as the adjacency from the start node to the next hop have failed, and that the next hop has failed at both Layer 3 and Layer1. In this case the fibres assumed to be failed are A to L and L to B. These fibres carry the adjacencies A to L, A to E, A to B, and node B interacts with the adjacencies B to C, C to F, and C to E. All assumed failed adjacencies are shown in FIG. 6 as dashed lines, and in the fifth row of the table of FIG. 2b). Once again it is possible that the first adjacency may pass through several nodes before reaching the next hop. In this case all of the fibres supporting this adjacency would be assumed to have failed, even if this is the majority of the network. In the assumption that these adjacencies have failed we now compute the shortest path to the next next hop (NNH) with the remaining topology. FIG. 6 shows this computed recovery path 51a, 51b, 51c, 51d in bold, i.e. the links A to H, H to J, J to K, K to C.

Figure 7:
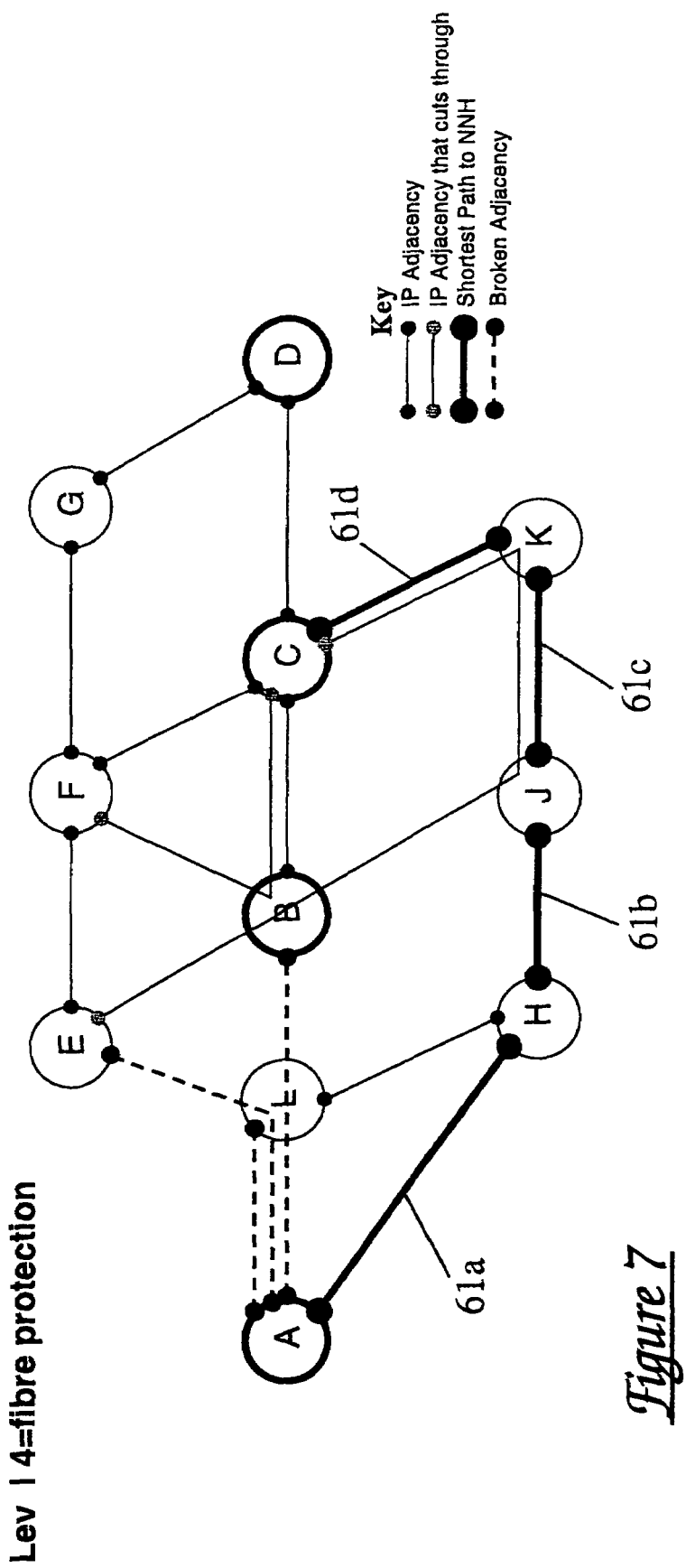

FIG. 7 depicts level 4 protection and illustrates the computation of a recovery path that circumvents the failure in the network under the assumption that e.g. a duct containing a fibre carrying an adjacency to node B has failed. All adjacencies that use fibres that share fate with the one that mediates the A to B adjacency are thus removed in the diagram of FIG. 7. At Level 4 protection (fibre protection), the assumption is made that all of the adjacencies passing through the same fibre ducts as the adjacency from the start node to the next hop have failed. In this case it is assumed that the fibres failed may be A to L or L to B. Because these fibres carry the adjacencies A to L, A to E, and A to B (shown as dashed lines in FIG. 6, and in the fourth row of the table in FIG. 2b), those adjacencies are removed prior to computation of the recovery path. It is possible that the first adjacency may pass through several nodes before reaching the next hop, in this case all of the fibres supporting this adjacency would be assumed to have failed, even if this is the majority of the network. In the assumption that these adjacencies have failed we now calculate the shortest path to the next next hop(NNH) with the remaining topology. FIG. 7 shows this computed path 61a, 61b, 61c, 61d in bold, i.e. the links A to H, H to J, J to K, and K to C.

Figure 8:
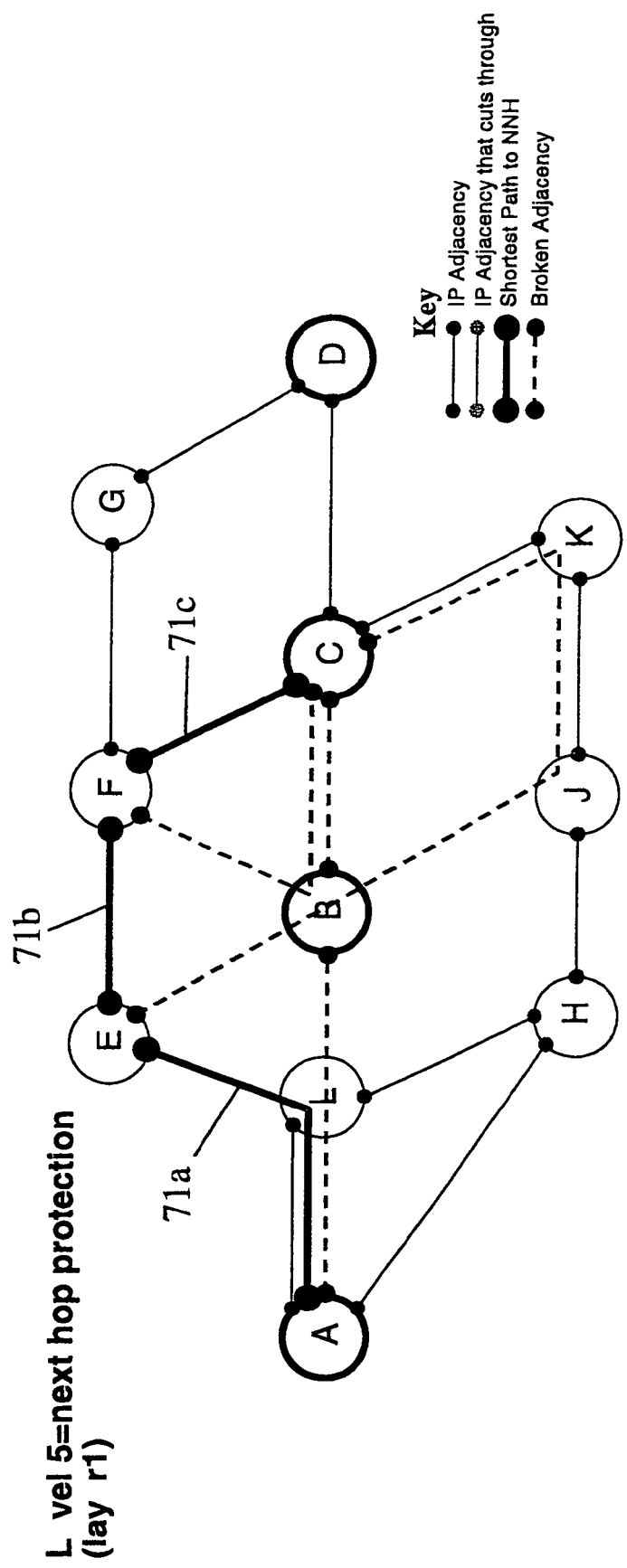

FIG. 8 depicts level 5 protection and illustrates the computation of a recovery path that circumvents the failure in the network under the assumption that the entire router and/or the entire switch has failed at node B. This is equivalent to loss of connectivity to node B at all network layers. In Level 5 protection (next hop protection-Layer 1), it is assumed that all Layer 3 and Layer 1 capabilities of the next hop (NH) have failed. In this case adjacencies A to B, B to C, C to F, and C to E (shown as a dashed black lines in FIG. 8 and in the third row of the table in FIG. 2b) are assumed to be failed and are removed prior to computation of the recovery path. Computation of the shortest path to the next next hop(NNH) with the remaining topology yields the path 71a, 71b, 71c shown in bold in FIG. 8, i.e. the links A to E, E to F, and F to C.

Figure 9:
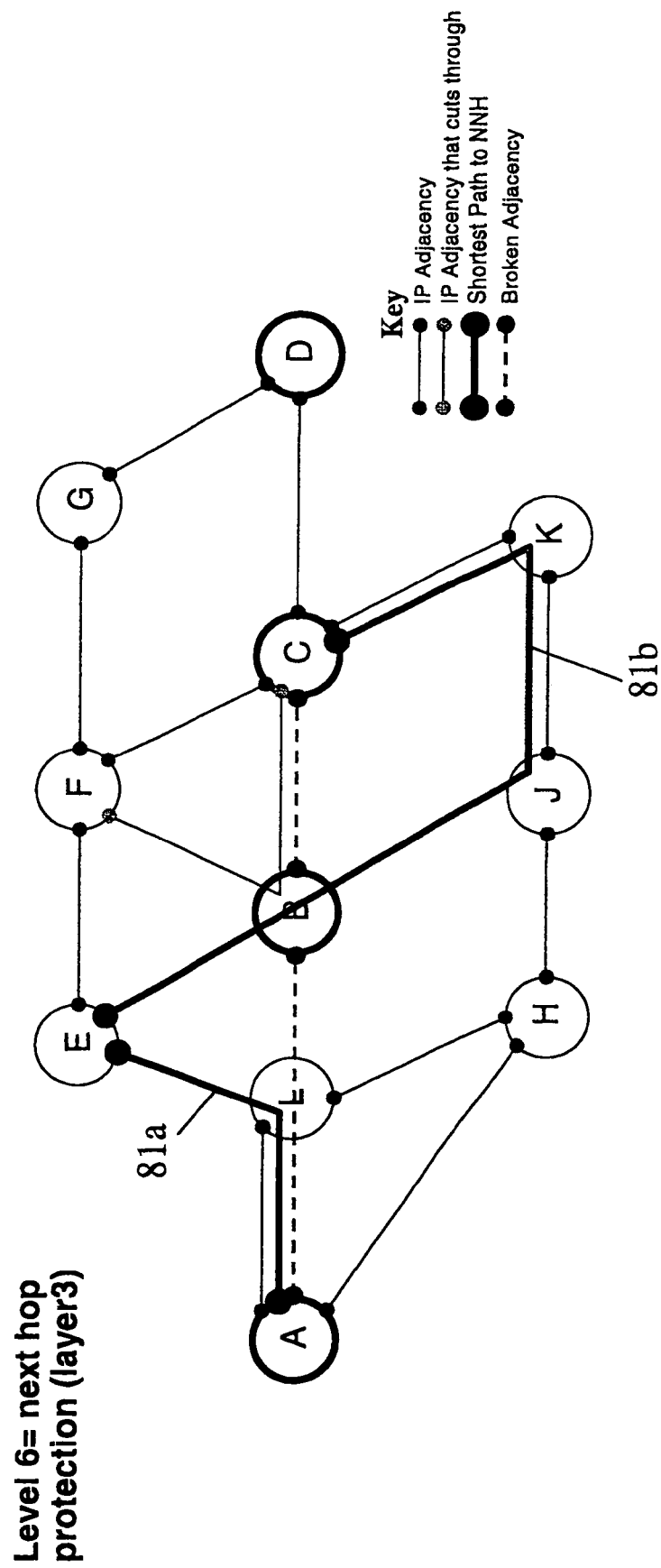

FIG. 9 depicts level 6 protection and illustrates the computation of a recovery path that circumvents the failure in the network under the assumption that the entire router at node B has failed. In level 6 protection (next hop protection-Layer 3), the assumption is made that all Layer 3 capabilities of the next hop (NH) have failed. Adjacencies A to B and B to C (shown as dashed lines in FIG. 9 and in row 2 of the table in FIG. 2b) are assumed to have failed and are removed prior to computation of the recovery path. The adjacency E to C is still available because it passes through node B but does not terminate there. The shortest path to the next next hop (NNH) is computed with the remaining topology to produce the recovery path 81a, 81b shown in bold, i.e. the links A to E, and E to C.

Figure 10:
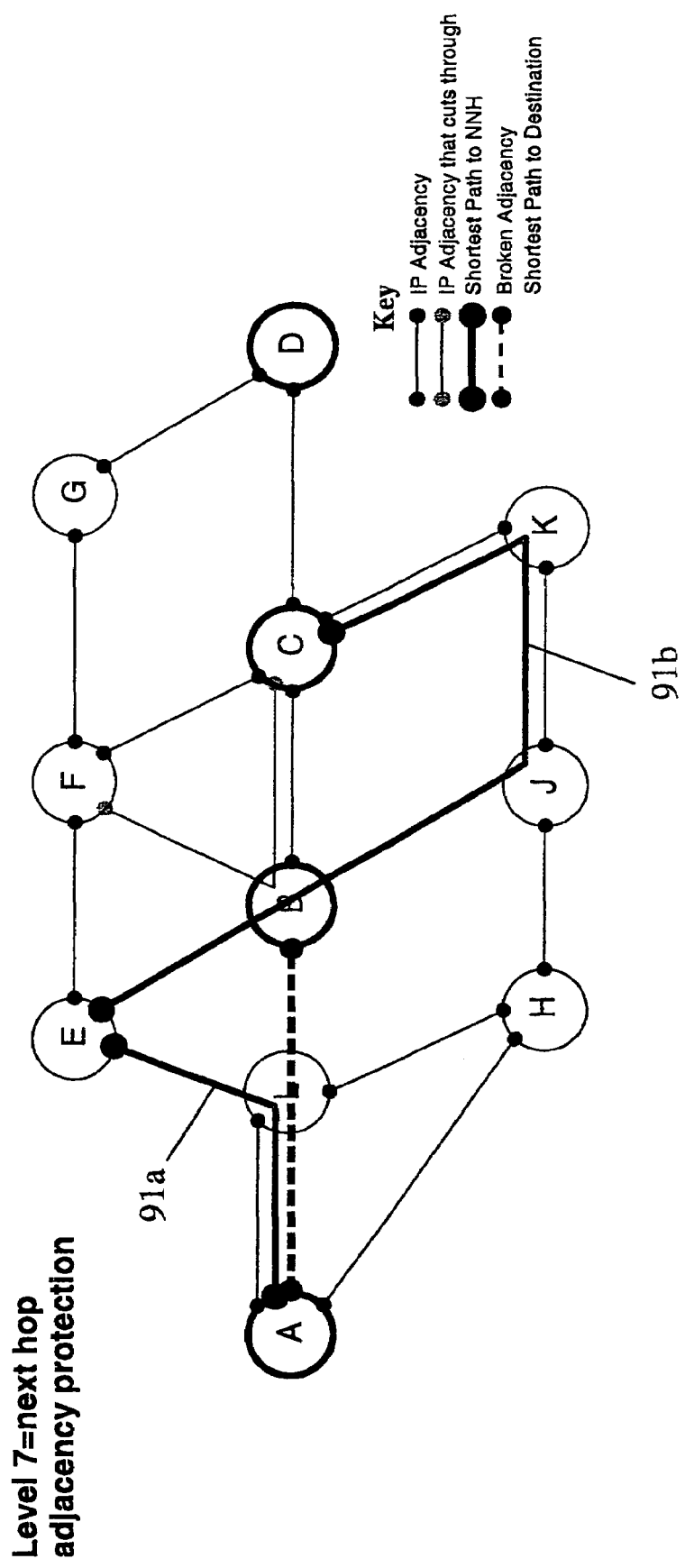

FIG. 10 depicts the computation of a recovery path that circumvents the failure in the network under the weakest assumptions, i.e. protection level 7 or the lowest level of the hierarchy of FIG. 2b. In protection at level 7, or next hop adjacency protection, the assumption is made that only the adjacency between a node and the next hop (NH) has failed. This may be due, for example, to the failure of an interface card. In this case it is only the adjacency A to B (shown as a dashed line in FIG. 10 and in row 1 of the table in FIG. 2b) that is assumed to have failed and has been removed from the copy of the model topology of FIG. 2a prior to computation of recovery paths. All other paths remain available for calculation purposes. The shortest path to the next next hop (NNH) is computed with the remaining IP layer topology. The schematic diagram of FIG. 10 shows this computed path 91a, 91b in bold, using the adjacencies A to E and then E to C. Both of the adjacencies on the recovery path 91a, 91b pass through those nodes whose failure may have contributed to the loss of adjacency between A and B. Under more stringent assumptions, at stronger protection levels described above, adjacencies supported by this equipment would be removed prior to computation of a recovery path.

Figure 11:
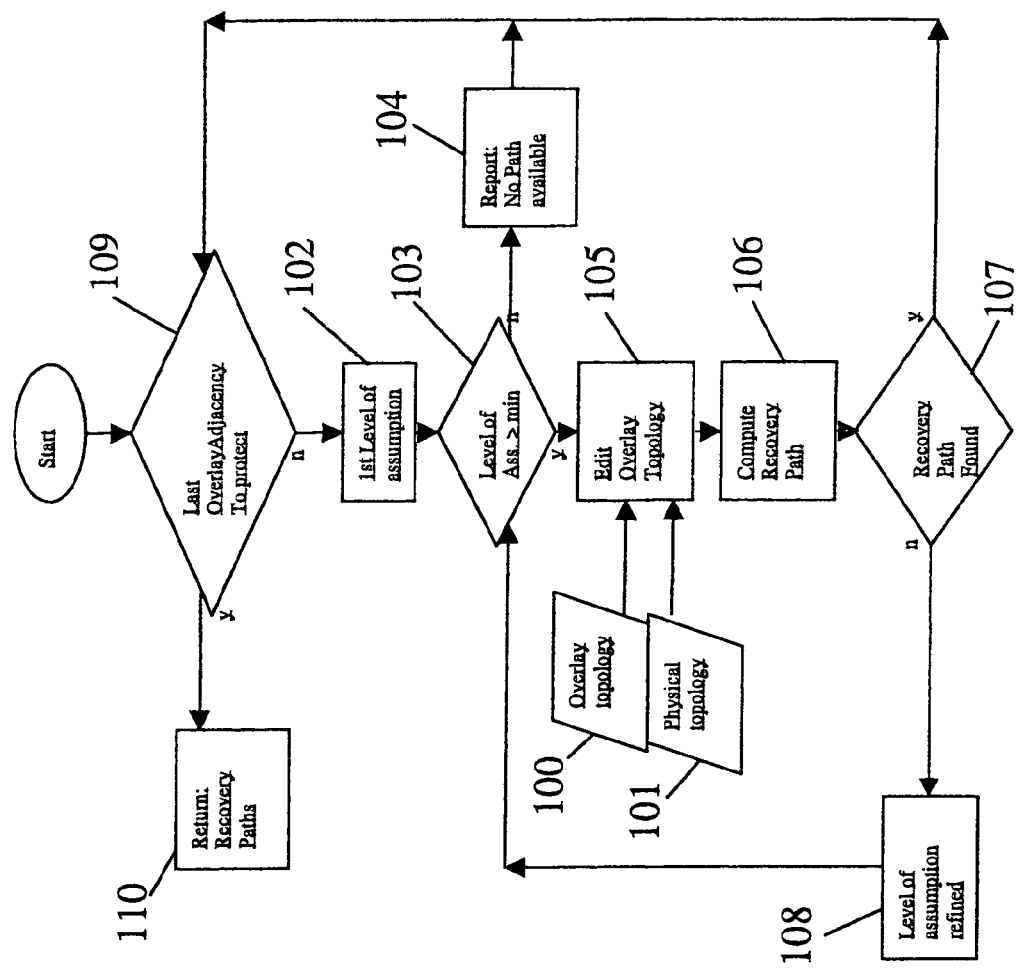
FIG. 11 is a flow chart depicting, a recovery path computation algorithm.

The algorithm employed to compute recovery paths in anticipation of failure is illustrated schematically in the flow diagram of FIG. 11, and takes as inputs representations of the overlay topology (100) and physical layer (101) and an appropriate starting protection level or initial level of assumption (102). The starting protection level may be chosen with reference to the estimated reliability of underlying equipment and with reference to the degree of protection that is envisaged for the traffic class. The starting level may also depend on a known reliability profile of individual network elements. If this starting level is not greater than a preset minimum value (103), the procedure is terminated (104).

For each IP adjacency for which a recovery path is to be produced, the algorithm starts at the indicated starting level and edits the overlay topology (105) using the physical topology to infer which adjacencies should be removed from the network model. If after removal and attempted computation (106) of a route to a destination along the path no such route is found (107), the assumption about what has failed is refined (108), the dependent adjacencies removed, and the path is re-computed. The process continues until a path is found or the most specific failure has been induced. The refinement of assumptions may involve policy choices that incorporate known reliabilities. When the last overlay adjacency to be protected (109) has been reached, a set of recovery paths is returned (110).

In this process, two lists are kept: These are, a list of adjacencies representing the overlay topology denoted as "T"; and a list of fibre paths, one for each adjacency, denoted as "F". For example, to describe the simple topology in the network of FIG. 1 described above, T={ (a,b), (b,d), (c,d) } and F={ [(a,b), { }], [(b,d), {v}], [(c,d), { }] }. Here we are representing fibre paths by sets of edge labels so that v=(b,c) and w=(c,d).

The editing algorithm performs the following steps.
(a) Loop through the adjacencies in the overlay topology, testing each adjacency against assumptions about what equipment has failed in light of a hypothesised IP layer adjacency loss indication.
(b) If the candidate adjacency passes the test, remove it from the topology.

There are four basic edits available in an IP over fibre case. Each edit is accomplished by evaluating a candidate adjacency, say (s, t) with fibre path G={V, w}, from the overlay topology to see if it is affected by the removal of the physical resource associated with loss of adjacency indication for an adjacency from the topology, say (x, y) with fibre path F={p, q}. If the test evaluates true, then the adjacency should be removed from the overlay topology. The four basic edits and the corresponding tests are shown in Table 1 below.

TABLE 1

| Edit | Test |
| --- | --- |
| Switch S failed | For any fibre f attached to S, f ∈ G |
| Fibre m failed | m ∈ G |
| Router R failed | For any adjacency termination x on Router R {s == x OR t == x} |
| Adjacency (x, y) failed | {s == x AND t == y} OR {t == x AND s == y} |

These basic edits can be combined so that assumptions about the extent of equipment failure may be varied to produce maximum possibility of reroute. For example, in protection level 7 described above with reference to FIG. 9, the only test required is to see if the candidate adjacency is the same as the one whose failure is indicated. If so, it is removed. In protection level 1 described above with reference to FIG. 3, all switches along the path to the destination of the alarmed adjacency are assumed to have failed and so, for each switch along the fibre path supporting the putatively failed adjacency, the test is applied to the candidate adjacency. This increases the number of adjacencies removed.

The above technique is also applicable to network structures supporting two or more virtual private/public networks (VPN). In such an arrangement, each VPN may have its own network manager and its own rules for selecting a start protection level so that protection paths may be calculated independently for each VPN.

It will be understood that the above description of a preferred embodiment is given by way of example only and that various modifications may be made by those skilled in the art without departing from the spirit and scope of the invention.

The invention claimed is:

1. A method of fault recovery in a multi-layer communications network having a transport layer topology and an overlay topology, in which adjacencies are defined between a plurality of network nodes, the method comprising, defining a model of the network and within each model for each adjacency for which a recovery path is to be determined, modifying the overlay topology by removal of selected adjacencies, attempting computation of a path, and if no path is available removing fewer than the selected adjacencies from the overlay topology and repeating said path computation.

2. A method as claimed in claim 1, wherein said adjacencies are selected from a knowledge of the transport layer topology.

3. A method of calculating a protection path for traffic carried on a main path in a multiplayer communications network having a lower transport layer and an upper layer incorporating a plurality of routers, and in which adjacencies are defined between respective pairs of routers, the method comprising the steps of;
defining a model of the network;
defining in said model a hierarchy of protection levels, each said protection level being characterised by a respective set of broken adjacencies in said model; attempting to calculate a recovery path for a selected protection level in said hierarchy; and
if no said path is available, removing fewer than the set of broken adjacencies and repeating said calculation attempt for successive further protection levels in said hierarchy until a protection path is identified.

4. A method of calculating a protection path for traffic carried on a main path in a multi-layer communications network comprising a lower transport layer and an upper overlay incorporating a plurality of routers, there being a plurality of adjacencies defined between respective pairs of routers, wherein the method comprises the steps of:
defining a software model of the overlay of said network;
defining in said model a hierarchy of protection levels for said main path, each said protection level being characterised by a respective set of one or more broken adjacencies associated with that protection level;
determining whether the calculated protection path is available in the network; and,
if said calculated path is not available in the network, repeating said path calculation and determining steps for one or more further selected protection levels.

5. A method as claimed in claim 4, wherein said protection levels are selected in order of hierarchy.

6. A method as claimed in claim 5, wherein said protection path is calculated via a next next hop algorithm.

7. A method as claimed in claim 6, wherein a protection level is selected according to a class of traffic carried on the path to be protected.

8. A method as claimed in claim 7, wherein said network incorporates a transport layer comprising a plurality of switches interconnected by optical fibre paths.

9. A method as claimed in claim 7, wherein the network model topology is defined by a first list of adjacencies representing the overlay topology, and a second list of paths, one for each adjacency.

10. A method as claimed in claim 9, and further comprising editing the network model topology by selecting sequentially the adjacencies in the overlay topology, testing each adjacency against assumptions about what equipment has failed in light of a hypothesised IP layer adjacency loss indication, and, if the adjacency passes the test, removing it from the topology.

11. A method as claimed in claim 10, wherein said transport layer comprises a synchronous network.

12. A method as claimed in claim 11, wherein said network is a packet network.

13. A method as claimed in claim 12, wherein said network is a multi-protocol label switched network.

14. A method as claimed in claim 13, wherein said network incorporates one or more virtual private networks.

15. A method of identifying a protection path for traffic carried on a main path in a multi-layer communications network so as to remedy a fault condition involving one or more network elements, the method comprising the steps of:
assuming the failure of a plurality of network elements;
calculating a protection path circumventing all the assumed failed network elements and determining whether that calculated path is an available path in the network; and
if said calculated path is not an available path in the network, successively assuming the failure of fewer than the assumed failed network elements and repeating the path calculation and determination steps for each successive assumption until an available protection path is identified.

16. Software stored in a computer-readable storage medium for identifying a protection path for traffic carried on a main path in a multi-layer communications network so as to remedy a fault condition involving one or more network elements, the software when executed in the computer-readable storage medium performing the method steps of:
assuming the failure of a plurality of network elements;
calculating a protection path circumventing all the assumed failed network elements and determining whether that calculated path is an available path in the network; and
if said calculated path is not an available path in the network, successively assuming the failure of fewer than the assumed failed network elements and repeating the path calculation and determination steps for each successive assumption until an available protection path is identified.

17. A method of network management for planning fault recovery paths in a multi-layer communications network having a transport layer and an overlay topology, and in which adjacencies are defined between a plurality of network nodes, the method comprising, providing a model of the network, and within said model for each recovery path to be determined, modifying the overlay topology by removal of selected adjacencies, attempting computation of a recovery path, and if no recovery path is available removing fewer selected adjacencies from the overlay topology and repeating said recovery path computation.

18. A method of network management for planning fault recovery paths in a multi-layer communications network so as to remedy a future fault condition involving one or more network elements on a traffic path, the method comprising the steps of:
assuming the failure of a plurality of network elements in said model;
calculating a protection path circumventing all the assumed failed network elements and determining whether that calculated path is an available path in the network; and
if said calculated path is not an available path in the network, successively assuming the failure of fewer than the assumed failed network elements and repeating the path calculation and determination steps for each successive assumption until an available protection path is identified.

19. A method for planning fault recovery paths in a multi-layer communications network so as to remedy a fault condition involving one or more network elements on a traffic path, comprising the method steps of:
providing a model of the network
assuming the failure of a plurality of network elements in said model;
calculating a protection path circumventing all the assumed failed network elements and determining whether that calculated path is an available path in the network; and
if said calculated path is not an available path in the network, successiveiy assuming the failure of fewer that the assumed failed network elements and repeating the path calculation and determination steps for successive assumption until an available protection path is identified.

20. A method as claimed in claim 19, and embodied as software in a computer readable form on a storage medium.

21. A communications network having a transport layer and an overlay topology, in which adjacencies are defined between a plurality of network nodes, wherein the network is provided with a path protection system for calculating recovery traffic paths so as to remedy network faults, said protection system being associated with a model of the network and being arranged to modify, within that model, the overlay topology by removal of selected adjacencies, to attempt computation of a path, and if no path is available, to remove fewer than the selected adjacencies from the overlay topology in said model and repeat said path computation.

22. A network as claimed in claim 21, wherein said protection system defines in said model a hierarchy of protection levels for said main path, each said protection level being characterised by a respective set of one or more broken adjacencies in said model.

23. A network as claimed in claim 22, wherein said protection system selects said protection levels in order of hierarchy.

24. A network as claimed in claim 23, wherein said protection path is calculated via a next hop algorithm.

25. A network as claimed in claim 24, and incorporating a transport layer comprising a plurality of switches interconnected by optical fibre paths.

26. A network as claimed in claim 25, wherein said transport layer comprises a synchronous network.

27. A network as claimed in claim 26, and comprising a packet network.

28. A network as claimed in claim 27, and comprising a multi-protocol label switched network.

* * * * *